Figure 1:
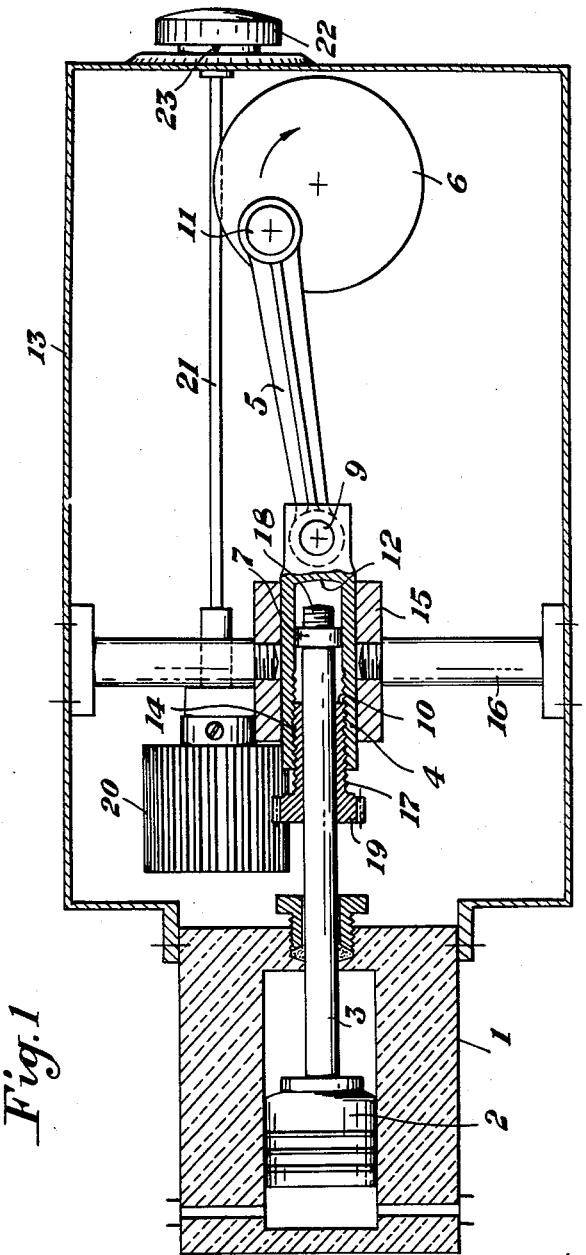

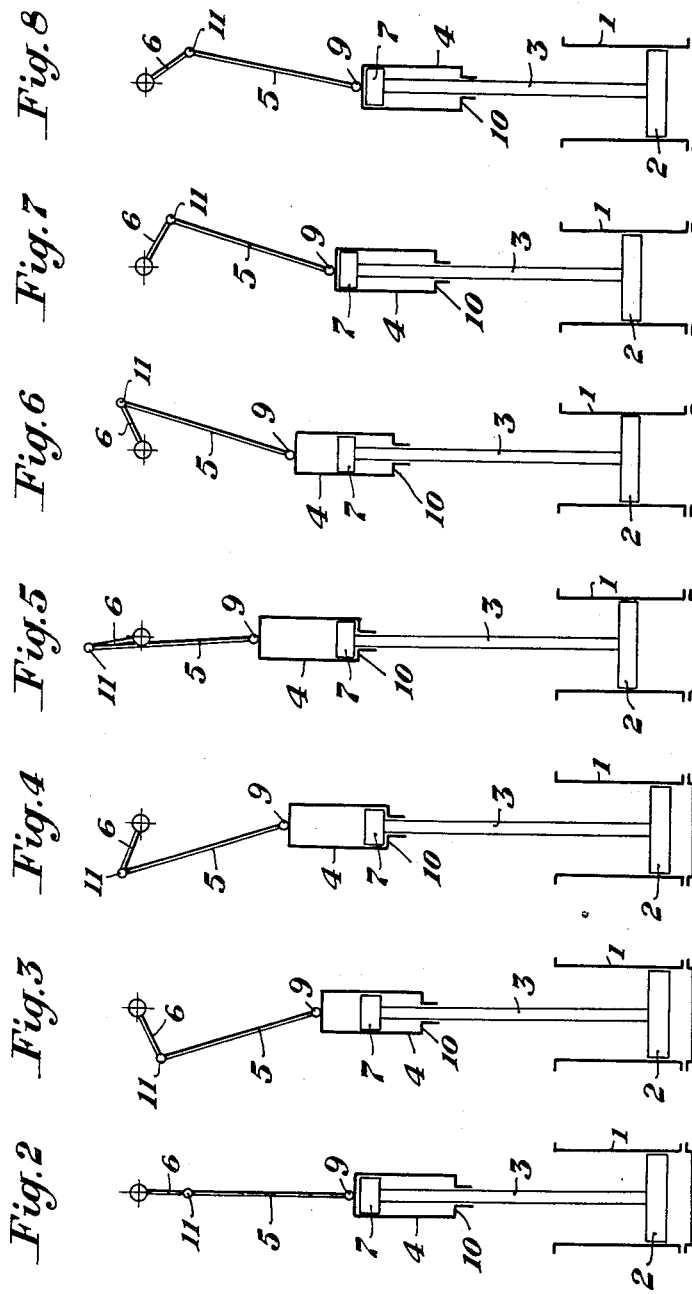

United States Patent Office 2,929,253
Patented Mar. 22, 1960

2,929,253

DEVICE FOR ADJUSTING FROM OUTSIDE, CONTINUOUSLY AND DURING ITS OPERATION, THE CAPACITY OF A PLUNGER PUMP

Gaetano Baldelli, Rome, Italy

Application October 24, 1958, Serial No. 769,457

Claims priority, application Italy December 18, 1957

3 Claims. (Cl. 74—44)

The present invention relates to a device for adjusting from outside, continuously and therefore with the possibility of a very high accuracy, the capacity of a plunger pump, even when the pump is operating.

A feature of the device according to this invention resides in the possibility of changing the capacity of a plunger pump by a telescope arrangement of a piston stem, and providing the means whereby the amount of the relative gliding of the two components of the telescopic stem may be adjusted, as well as the means whereby said adjustment can be carried out from outside of the pump mechanism and particularly while the pump is operating.

More specifically, the telescope arrangement of the piston stem is embodied according to this invention, by forming said stem with a sheath portion which may be directly connected to the connecting small end at its closed end, and forming the open end of said sheath with inner threads. To said threads is screwed a bored bushing which is passed through by that portion of the piston stem which is rigidly connected to the piston. Said portion of the piston stem is provided at its end inside the sheath with an abutment member, adjustable if the case may be, suitable to rest, if the possibility of the relative telescopical movement between the sheath and the rod subsists, against the edge of the bushing inside the sheath, while the end of said stem can abut against the bottom of the sheath, in the two extreme positions of the telescopic movement, respectively.

It will be possible to adjust the extent of said telescopic movement by screwing in, to a greater or lesser extent, the bushing into the sheath, between a rigid connection position, or minimum gap position, when the end of the bushing abuts against the abutment of the stem and simultaneously the end of the stem abuts against the bottom of the sheath, and a maximum gap position when the bushing has been carried to its position of maximum permissible removal from the sheath.

It is clear, and it will be more specifically explained hereinafter, that the "lost movement" existing between the two parts forming the piston stem, originates a variation of the capacity of the alternating pump. The invention provides the possibility of adjusting said "lost movement" by providing the means whereby it will be possible, from outside of the pump and while the latter is operating, to cause the axial movement of the bushing within the sheath. To this purpose, the outer end of said bushing is provided with a spur pinion, either integral or formed thereon, said pinion engaging a long toothed spur gear arranged parallel to the movement axis of the plunger and apt to be rotated from outside of the pump. When the long toothed gear is rotated, also the pinion of the bushing is rotated, and therefore also the bushing is rotated and finally a greater or lesser insertion of the bushing into the sheath is thereby determined.

It is to be noted that no stress subsists between the teeth in mesh and therefore the adjustment of the extent of the movement and the possibiliy of adjustment of the capacity are easily and continuously secured by the gliding movement of the terminal teeth of the bushing along the teeth of gear actuated from outside, while the latter has, as far as its resistance to rotation is concerned, only the resistance induced by the screwing movement of the bushing into the sheath.

This invention will be more specifically described, only by way of example, in one preferred embodiment with reference to the attached drawings, wherein:

Fig. 1 is a longitudinal cross-section, of the pump cylinder and of the entire device according to this invention, and Figs. 2 to 8 diagrammatically show the several operating positions of the unit and are intended to illustrate how the capacity decrease is obtained.

With reference to the drawings and considering first the diagrams of the Figs. 2 to 8 where for clarity of illustration it has been assumed that the device according to this invention is pre-disposed for the maximum decrease of capacity and the means for changing said capacity has not been shown, Fig 2 shows the position where in the cylinder 1 the piston is at the end of the outlet stroke and this position by example is taken as the initial point of the cycle.

The numeral reference 3 denotes the stem fixed to the piston 2, said stem being provided at its end with the abutment member 7, apt to glide within the sheath 4 between the bottom of the sheath and the end stop member 10 which in this instance is stationary. The sheath 4 is pivoted at 9 to the connecting rod 5 in turn pivoted at 11 to the crank 6 which is assumed to rotate clockwise. In the subsequent operative step (Fig. 3), the revolution of the crank 6 lifts the sheath 4, while the piston 2 remains stationary at its position and the abutment 7 glides within the sheath 4. At the end of this phase (Fig. 4), the abutment 7 has come into contact with the stop member 10 and therefore (Fig. 5) the further rotation of the crank 6 lifts simultaneously and through the same extent both the sheath 4 and the piston 2 carrying the latter up to the end of the suction stroke. The prosecution of the clockwise rotation causes the crank 6, through the connecting rod 5 to start lowering again the sheath 4. While the piston 2 remains stationary within the cylinder 1, and this (Fig. 7) until the abutment member 7 comes into contact with the bottom 12 of the sheath. Starting from this moment (Fig. 8), during the further rotation of the crank 6, the sheath 4 and the stem 3 move bodily while the piston carries out its outlet stroke within the cylinder 1 until to reach the position shown at Fig. 2, wherefrom the cycle starts again.

Obviously the piston travels within the cylinder 1, a stroke which is as much shorter than the stroke of the connecting rod end, as is the extent of the adjustment possibility of the abutment member 7 within the sheath 4. By adjusting said extent the capacity of the pump cylinder is thereby adjusted.

Fig. 1 shows a possible and preferred mechanical embodiment of the device hereinbefore diagrammatically described. It is to be noted that for sake of clarity, the same numeral references already used in connection with the figures of the diagrammatical specification, have been used to denote the same parts.

The device is enclosed within the casing 13 to which the cylinder 1 of the pump is applied. Within the casing 13 rotates the crank 6 to the pin 11 of which is pivoted the connecting rod 5 the end 9 of which is pivoted to the sheath 4 which is at least partially internally threaded as shown at 14. The sheath is guided through its reciprocation, by the guide 15, held by the support 16 fastened to the casing 13. Into the sheath is received the bush 17, the inner edge of which forms the afore cited abutment member 10. The stem 3 of the piston is provided with the abutment member 7 which is embodied by a ring threadedly engaged onto a terminal portion 18 of the stem 3, to embody the possibility of adjustment of its position.

The bushing 17 terminates outside of the sheath 4, by a spur gear 19 engaging the long toothed spur gear 20 supported by the guide 15 and provided with a shaft 21 which outside of the casing 13 carries an actuating knob 22 provided with a position mark 23.

When the knob is rotated, also the gear 20 rotates and thus the pinion 19, to change the extent of the bushing 17 received into the sheath 4 from a position where the end edge 10 bears on the abutment part 7, while the end of the stem 3 rests on the bottom 12 of the sheath 14 (maximum capacity of the pump), to a position where the edge 10 is fully spaced apart from the bottom 12 to allow the maximum lost movement of the abutment member 7 (minimum capacity of the pump). As aforesaid, this adjustment may be carried out while the pump is operating.

The device could also be completed by other components which are not strictly related to this invention as for instance springs or other damping devices between the stem and the sheath.

The device is capable of being used for pumps of any kind, but a particular use of this invention is to be expected for small power, slow pumps.

While a specific embodiment of this invention has been shown and described in detail to illustrate the application of the invention principles, it will be understood that the invention may be embodied otherwise without departing from such principles.

I claim:

1. In a variable-capacity plunger pump having a lost-motion connection and comprising a piston stem, a device for adjusting the extent of the lost-motion, which comprises a casing associated to the variable-capacity pump and containing said device and a connecting rod-crank unit to operate said piston stem, said device being formed of a sheath closed at one end and articulately connected at the closed end to the connecting rod, a guiding sleeve connected to the inner wall of said casing to support slidably said sheath, a closing member for said sheath axially movable in the sheath to vary the inner room of the sheath from a minimum to a maximum volume, a spur gear fastened to said closing member, a toothed wheel with cylindrical teeth having a length greater than the length of said spur gear, said toothed wheel being arranged inside said casing and engaging said spur gear, a shaft fastened to said toothed wheel and supported by said casing parallel to the axis of said sheath, means outside of said casing and hand operable at will to move said shaft and said toothed wheel and vary the volume of the inner room of said sheath.

2. In a variable-capacity plunger pump having a lost-motion connection and comprising a piston stem, a device for adjusting the extent of the lost-motion, which comprises a casing associated with the variable-capacity pump and containing said device and a connecting rod-crank unit to operate said piston stem, said device being formed of a sheath closed at one end and articulately connected at the closed end to the connecting rod, a guiding sleeve slidably supporting said sheath, two supporting members fastened to the inner wall of said casing and perpendicular to said wall, said supporting members being arranged to support said sleeve member, said sheath having the inner surface formed of a smooth portion and a threaded portion, an abutment member screwed at the end of said piston stem and sliding in said smooth portion of the sheath, a bushing externally threaded which engages in said threaded portion of said sheath, said bushing being provided with an axial bore wherein said piston stem slides, said bushing having its end outside of the sheath in the form of a spur gear, a toothed wheel with cylindrical teeth having a length greater than said spur gear, said toothed wheel receiving in engagement for rotation said spur gear, said spur gear being arranged to longitudinally slide on said toothed wheel when said spur gear is made to rotate for varying the position of said bushing inside said sheath and to determine at will inside said sheath the stroke which has to be carried out by said abutment member screwed at the end of said piston stem, means associated with said toothed wheel to rotate at will said toothed wheel from the outside of said casing.

3. A device for adjusting the extent of the lost-motion in a variable-capacity plunger pump according to claim 2, wherein the means to rotate said toothed wheel comprise a shaft fastened to said toothed wheel and parallel to said sheath, said shaft being supported at one end by said supporting members fastened to the inner wall of the casing, and at the other end by the bottom wall of said casing, a knob fastened at the free end of said shaft outside of said casing, a position mark associated with said knob to determine the position of said toothed wheel with respect to said spur gear and hence the position of said bushing inside of said sheath.

References Cited in the file of this patent

UNITED STATES PATENTS

| Number | Name | Date |
|---|---|---|
| 662,455 | Messerer | Nov. 27, 1900 |
| 678,172 | Grist | July 9, 1901 |
| 961,865 | Kleinhan | June 21, 1910 |
| 1,102,782 | Mills | July 7, 1914 |
| 2,345,693 | Wilson et al. | Apr. 4, 1944 |
| 2,431,070 | Nelson | Nov. 18, 1947 |
| 2,495,084 | Wells | Jan. 17, 1950 |
| 2,501,101 | Sharp | Mar. 21, 1950 |
| 2,503,907 | Hefler | Apr. 11, 1950 |
| 2,696,786 | Fleck et al. | Dec. 14, 1954 |
| 2,767,588 | Drury | Oct. 23, 1956 |
| 2,771,846 | Horton et al. | Nov. 27, 1956 |
| 2,892,352 | Saalfrank | June 30, 1959 |